Patented Oct. 25, 1932

1,884,626

UNITED STATES PATENT OFFICE

HENRY DREYFUS, OF LONDON, ENGLAND

MANUFACTURE OF ALIPHATIC ACID ANHYDRIDES

No Drawing. Application filed January 4, 1929, Serial No. 330,410, and in Great Britain January 28, 1928.

This invention relates to the manufacture of aliphatic anhydrides from aliphatic acids and especially to the manufacture of acetic anhydride from acetic acid.

In Bulletin de la Société Chimique de France Vol. XXXI (1922) pages 113–118 experiments are described by Peytral wherein acetic acid vapour is led through platinum tubes heated to 1150° C. In these experiments on rapid passage of the vapour, small quantities (about 2 to 3%) of acetic anhydride were obtained, the major part of the liquid obtained by condensation of the reaction vapours consisting of acetic acid; and the gaseous decomposition products (such as methane, $CO_2$ etc.) formed were very small in quantity; with decreased speed of passage of the vapour, however, the products of decomposition contained no anhydride and considerable quantities of gaseous products such as methane, acetylene, hydrogen, carbon dioxide were formed. It would seem from these experiments that in the case where anhydride was produced the acetic acid vapour was passed through the tube much too fast to allow it to attain a temperature of 1150° C. and that when, owing to slower passage of the acid vapour, the vapour was subjected to higher temperatures, the reaction was more violent and the sole products of decomposition were gases such as methane, $CO_2$, CO etc. My experiments have confirmed this view and I have found that when passing acetic acid vapour through platinum tubes in such manner that the vapour is allowed to attain temperatures of even 700 to 800° C. very considerable decomposition to gaseous products occurs. It is evident from my experiments that when Peytral produced acetic anhydride with but negligible decomposition to gaseous products the acetic acid vapour must only have attained a temperature below 700–800° C., and probably a temperature of from 500–700° C.

In the manufacture of acetic anhydride or other aliphatic anhydrides by subjecting acetic acid vapour or other aliphatic acid vapour to the action of heat certain difficulties are liable to arise when employing high temperatures and/or when performing the process for prolonged periods. Thus for instance, when employing high temperatures the acid vapour often becomes decomposed with the formation inter alia of gaseous products (e. g. methane, $CO_2$ and CO) and carbon, which carbon becomes deposited in the reaction zone and—where a catalyst is employed—upon the surface of the catalyst. Prolonged operation at lower temperatures appears to cause similar destructive decomposition.

I have now found that highly satisfactory results may be obtained if the aliphatic acid vapour is subjected to the reaction in admixture with carbon monoxide or mixtures of carbon monoxide and carbon dioxide.

It would appear that the admixture of the carbon monoxide serves (besides acting as a diluent to moderate the action of heat) to reduce any air which may be present in the mixture thus avoiding oxidation and loss of the aliphatic acid vapours, and that the carbon dioxide produced by such reduction, or admixed with the aliphatic acid vapour, serves to oxidize and remove from the sphere of reaction any carbon which may be formed with the formation of carbon monoxide.

According to the invention I produce acetic anhydride or other aliphatic anhydride by subjecting the vapour of acetic or other aliphatic acid in admixture with carbon monoxide or other mixtures of carbon monoxide and carbon dioxide to thermal decomposition, i. e. to the action of high or relatively high temperatures. I preferably admix a substantial or relatively large proportion of the carbon monoxide or of the carbon monoxide and carbon dioxide mixture with the aliphatic acid vapour, for instance about 1 to 5 or 1 to 10 parts or more relatively to each part of aliphatic acid vapour. In performing the invention I preferably employ mixtures of carbon monoxide and carbon dioxide, for instance mixtures containing 10% to 80% or more of carbon monoxide.

The reaction may be performed at temperatures of from about 250° C. to 700° C. and preferably at temperatures of from about 300° to 600° C.

The reaction may, if desired, be performed in presence of catalysts known to promote the scission of aliphatic acids into their anhydrides which catalysts may if desired, be spread upon or deposited upon pumice, kieselguhr or other contact or filling materials. For instance the reaction may be performed in presence of the catalysts described in my Patents Nos. 1,735,956 and 1,735,962.

In performing the invention I may, for instance, first mix the aliphatic acid vapour with the desired quantity of carbon monoxide or carbon monoxide and carbon dioxide and pass the resulting mixture through fire clay, fused silica or other tubes or other form of apparatus heated to the desired temperature, which tubes or apparatus may, if desired, be filled with or otherwise contain catalysts or contact materials. Or for instance, I may pass a stream of carbon monoxide or of carbon monoxide and carbon dioxide through hot or boiling acetic or other aliphatic acid and pass the resulting mixture of CO (or CO and $CO_2$) and aliphatic acid vapour through the said heated tubes or apparatus, the stream of carbon monoxide (or carbon monoxide and carbon dioxide) being regulated to ensure the desired composition of the resulting mixture. It will of course be understood that the carbon monoxide (or carbon monoxide and carbon dioxide) may be admixed with the aliphatic acid vapour in any suitable way and that I do not limit myself in this respect.

It is also to be understood that I do not limit myself as to the pressures to be employed in the reaction as the reaction may be performed under ordinary atmospheric pressure, or under reduced pressure or "vacuum" or under pressures higher than atmospheric such for instance as 3 to 100 atmospheres or more.

The anhydride produced by the process of the invention may be separated or recovered from the reaction gases or vapours in any suitable way. In cases where the reaction is performed under pressures higher than atmospheric, the reaction gases or vapours are preferably not treated to separate or recover the anhydride under such pressures but are preferably first passed through suitable apparatus (for instance one or more reducing valves) to reduce the pressure of said gases or vapours to atmospheric pressure or other conveniently low pressure.

In order to avoid hydrolysis and consequent loss of anhydride the reaction gases or vapours are preferably not submitted to simple condensation but are treated to separate the anhydride from the water vapour present or formed in the reaction.

For instance the hot reaction gases or vapours may (it may be after passing through one or more reducing valves or like apparatus) be subjected to fractional condensation, for example by leading them up through one or more fractionating columns maintained at a temperature or temperatures intermediate between the boiling points (under the conditions of pressure obtaining) of the anhydride and of water whereby the anhydride is condensed and the water passes on in vapour form.

Or, for instance, the reaction gases or vapours may (it may be after passing through one or more reducing valves or like apparatus) be passed through one or more solvents for the anhydride which are insoluble or substantially insoluble in water and of higher boiling point than water (preferably of higher boiling point than the anhydride), such solvents being employed at temperatures intermediate between the boiling points (under the conditions of pressure obtaining) of water and of the anhydride, whereby the anhydride is condensed or absorbed and the water escapes in vapour form. As examples of such solvents may be mentioned chlorbenzene, paradichlorbenzene, benzyl ether, tetrachlorethane, paraffin oil, triacetin, phenetol, anisol, one or more cresols, and paracresyl acetate.

Or, for instance, the reaction gases or vapours may (it may be after passing through one or more reducing valves or like apparatus) be subjected to condensation by the process described in British Patent No. 303,772, that is to say the anhydride may be condensed from the reaction vapours whilst carrying away the water by the vapour of one or more entraining liquids. In such form of execution the reaction vapours are preferably mixed after leaving the reaction zone (and, it may be, after passing through one or more reducing valves or the like) with the vapours of the entraining liquid or liquids at a temperature below the boiling point (under the conditions of pressure obtaining) of the anhydride. Conveniently such mixing may be performed by introducing the reaction vapours (which should not be allowed to cool below the boiling point of water before becoming mixed with the vapours of the entraining liquid or liquids) into a vessel up which the vapours of the entraining liquid or liquids are caused to rise; by this means the anhydride may be substantially condensed and the water vapour carried away with the vapours of the entraining liquid or liquids. Examples of entraining liquids which I may use for such method of condensation are, as indicated in the said British Patent No. 303,772, benzene, carbon tetrachloride, petrol, mixtures of two or more of such bodies, or mixtures of ether with petroleum ether; it will be understood, however, as explained in the said British Patent No. 303,772, that any other liquids chemically inert to the anhydride and having a high entraining capacity for water may be employed. The liquids should preferably have a low entraining capacity for the anhydride.

Or, for instance, the reaction gases or vapours may (it may be after passing through one or more reducing valves or like apparatus) be subjected to condensation by the process described in British Patent No. 268,667, that is to say they may be subjected to condensation by leading them under the surface of an "extracting" liquid cooled down or otherwise kept at temperatures below (and preferably considerably below) the boiling point of water. By the term extracting liquid is meant a liquid or liquid mixture in which the anhydride is soluble and which is chemically inert to the anhydride and insoluble or substantially insoluble in water. As examples of such "extracting" liquids may be mentioned benzene, choloroform, and mixtures of ethyl ether or cholorform with one or more hydrocarbons such as light paraffins, gasoline, kerosene, benzol, or its homologues. It is preferable to use as extracting liquids, liquids which are themselves hydrocarbons, or which contain hydrocarbons, for example benzene or mixtures of ethyl ether or chloroform with one or more hydrocarbons such as paraffins (particularly the petroleum fraction of boiling point 40° to 70° C. termed petroleum ether), gasoline (boiling point 70° to 90° C.), kerosene, benzol or its homologues. The following particular examples of extracting liquids are very suitable:—ether in admixture with petroleum ether, choloroform, mixed with petroleum ether and/or gasoline; and mixtures of ether and petroleum ether containing about 30% to 50% petroleum ether are especially suitable.

Or, for instance, the reaction gases or vapours may (it may be after passing through one or more reducing valves or like apparatus) be treated by the process described in my U. S. Patent No. 1,817,614 that is to say they may be passed over or otherwise in contact with one or more "water binding" substances maintained at a temperature or temperatures below (and preferably substantially below) the temperature at which the reaction vapours are produced. By such treatment the water vapour may be substantially absorbed from the reaction vapours. In such treatment the water binding substances are preferably maintained at temperatures above the boiling point (under the conditions of pressure obtaining) of water to avoid condensation of water and the resulting risk of loss of anhydride through hydrolysis; and for the best functioning of the treatment the water binding substances should be employed at temperatures above the boiling point of the anhydride, in which case the water can be substantially absorbed and the anhydride pass on in vapour form. The term "water binding" substance means bisulphates, pyrosulphates (especially bisulphates and pyrosulphates of the alkali and earth alkali metals), zinc chloride, calcium chloride, orthophosphoric acid, metaphosphoric acid, pyrophosphoric acid and like substances which have affinity (and preferably high affinity) for water but excluding substances having a deleterious effect on aliphatic acids or anhydrides, such as sulphuric acid.

It will be understood that the invention is not limited as to the strength of aliphatic acid employed. The process can be performed even with the vapours of dilute acids; and besides affording a ready means for the manufacture of anhydrides from concentrated or highly concentrated acids, it affords valuable means for producing anhydrides from waste or dilute acids, especially waste or dilute acetic acids such as result from the acetylation of cellulose or other industrial acetylation processes.

The following example serves to illustrate one form of execution of the invention, it being understood that it is given only by way of illustration and is in no way limitative.

*Example*

A mixture of acetic acid vapour and carbon monoxide, containing about 1 to 5 parts by volume of carbon monoxide relatively to each part of acetic acid vapour, is passed in a rapid stream through a fine clay tube heated to a temperature of between 500 and 600° C. the tube being filled with sodium bisulphate or sodium pyrosulphate coated upon pumice.

The hot gases from the reaction zone are subjected to fractional condensation by leading them upwards through one or more fractionating columns maintained at a temperature intermediate between the boiling point of acetic anhydride and that of water, whereby the acetic anhydride is substantially condensed from the reaction gases and the water escapes in vapour form.

What I claim and desire to secure by Letters Patent is:—

1. In a process for the manufacture of an aliphatic anhydride by thermal decomposition of an aliphatic acid, the step of avoiding oxidation, by oxygen present, of the aliphatic acid by effecting the thermal decomposition in the presence of carbon monoxide.

2. In a process for the manufacture of an aliphatic anhydride by thermal decomposition of an aliphatic acid, the step of avoiding oxidation, by the oxygen present, of the aliphatic acid by effecting the thermal decomposition in the presence of from 1–10 parts of carbon monoxide to each part of aliphatic acid vapor.

3. In a process for the manufacture of an aliphatic anhydride by thermal decomposition at temperatures between 250° and 700° C. of an aliphatic acid, the step of avoiding oxidation, by oxygen present, of the aliphatic acid by effecting the thermal decomposition in the presence of carbon monoxide.

4. In a process for the manufacture of an aliphatic anhydride by the thermal decomposition of an aliphatic acid, the step of avoiding oxidation and violent decomposition of the aliphatic acid by effecting the thermal decomposition in the presence of carbon monoxide and carbon dioxide.

5. A process according to claim 4 wherein the amount of carbon monoxide present is 1 to 10 parts relatively to each part of aliphatic acid vapor and between 10 and 80% relatively to the total amount of carbon monoxide and carbon dioxide employed.

6. In a process for the manufacture of acetic anhydride by the thermal decomposition of acetic acid vapor, the step of avoiding oxidation of the acetic acid by performing the thermal decomposition in the presence of carbon monoxide.

In testimony whereof I have hereunto subscribed my name.

HENRY DREYFUS.